United States Patent [19]

Cirkel et al.

[11] Patent Number: 4,763,093
[45] Date of Patent: Aug. 9, 1988

[54] HIGH-POWER PULSE TRANSFORMER FOR SHORT HIGH-VOLTAGE AND/OR HIGH-CURRENT PULSES

[75] Inventors: Hans-Jürgen Cirkel, Uttenreuth; Willi Bette, Erlangen, both of Fed. Rep. of Germany

[73] Assignee: Kraftwerk Union Aktiengesellschaft, Mülheim/Ruhr, Fed. Rep. of Germany

[21] Appl. No.: 898,707

[22] Filed: Aug. 21, 1986

[30] Foreign Application Priority Data

Aug. 21, 1985 [DE] Fed. Rep. of Germany ....... 3529915

[51] Int. Cl.$^4$ ...................... H01F 27/10; H01F 27/30
[52] U.S. Cl. ....................... 336/58; 336/92; 336/181; 336/183; 336/184
[58] Field of Search ....................... 336/55, 62, 57, 58, 336/90, 92, 94, 180, 181, 182, 183, 184, 185, 210, 61, 60

[56] References Cited

U.S. PATENT DOCUMENTS 1,807,854  6/1931  Meyerhans .................... 336/181 X
3,721,932  3/1973  Fierstien et al. ............... 336/183 X
3,984,756  10/1976 Korotkov et al. ................ 336/184

FOREIGN PATENT DOCUMENTS 0072151  2/1983  European Pat. Off.
0024576  7/1984  European Pat. Off.
0130443  1/1985  European Pat. Off.
2529296  1/1977  Fed. Rep. of Germany.
3323614  1/1985  Fed. Rep. of Germany.

OTHER PUBLICATIONS

Instr. & Experimental Techniques, vol. 22, No. 4, Part 2, Jul./Aug. 1979, pp. 1053-1056, "Powerful High-voltage Pulsed Transformer".
Rev. Sci. Instrum., vol. 50, No. 9, Sep. 1979, pp. 1151-1153, (Merchant et al.) "Novel Transformer Designs for High-power, etc.".
Rev. Sci. Instrum., vol. 54, No. 6, Jun. 1983, pp. 716-718 (Matera et al.) "Resonant Transformer Command Charging System for High, etc.".

(List continued on next page.)

Primary Examiner—Thomas J. Kozma
Attorney, Agent, or Firm—Herbert L. Lerner; Laurence A. Greenberg

[57] ABSTRACT

A high-power pulse transformer for short, high-voltage and/or high-current pulses includes:
a base plate in a container, an insulating, cooling dielectric liquid with a given heat transfer coefficient in the container;
at least one magnet core on the base plate with self-enclosed magnet legs around a central window and wide sides with axes normal to the axis of the window;
at least an undervoltage and an overvoltage winding in the liquid wrapped in each other around parts of the magnet core immersed in the liquid and linked to the magnet core and to each other, the windings including turns of substantially mutually doubly-wound electrically insulated metallic conductors having winding ends disposed in leadthroughs in the container walls, the conductors having surfaces with a heat transfer coefficient higher than that of the dielectric liquid;
the turns of each winding being self-supported and spaced apart from the turns of the other winding by a first minimum spacing and spaced from the magnet core by a second minimum spacing;
support insulators partly disposed in the liquid and adjacent and spaced from at least one side of the magnet core by a third minimum spacing being greater than the sum of the second minimum spacing and the thickness of the turns, at least the ends of the windings being secured in recesses formed in the support insulators; and
a device for retaining the magnet core and the support insulators on the base plate.

14 Claims, 7 Drawing Sheets

OTHER PUBLICATIONS

J. Phys. E. Sci. Instrum., vol. 54, No. 6, Jun. 1983, pp. 716–718, Germer, "X-Ray Flash Techniques, Great Britain.

Optics Communications, vol. 42, No. 2, Jun. 1982, pp. 128–132, (Shields et al.) "Short Pulse, X-Ray Preionization of a High-Pressure, etc.".

Rev. Sci., Instrum., vol. 52, No. 11, Nov. 1981, pp. 1651–1654 (Levatter et al.), "Low Energy X-Ray Preionization Source for Discharge, etc.".

The Corona-Plasma Cathode, A New Long-Life E--Beam Cathode for X-Ray Preionization (Levatter et al.), pp. 754–757.

Parallel-Plate Windings Transformer for Pulsed Power Applications, (Galbraith), pp. 238–241.

Scientific American, vol. 242, No. 4, Apr. 1980, "Metallic Glasses (Chaudhari et al.), pp. 84–97.

HIGH-POWER PULSE TRANSFORMER FOR SHORT HIGH-VOLTAGE AND/OR HIGH-CURRENT PULSES

BACKGROUND OF THE INVENTION

Field of the Invention

The invention relates to a high-power pulse-transformer for short high-voltage and/or high-current pulses, preferably for high-power laser circuits, including at least one magnet core having self-enclosed magnet legs disposed around a central window and having two wide sides of the magnet core with axes being normal to the axis of the window, at least one undervoltage winding and at least one overvoltage winding wrapped around the magnet core and linked to the magnet core and to each other, the windings having turns of electrically insulated metallic conductors being substantially doubly-wound relative to each other.

Such a high-power pulse transformer is known from publication (1) listed below. However, before discussing such a device in detail, the fundamental nature of the device will be discussed.

Direct coupling, high-power, pulse engineering often does not succeed in matching the load resistance to the characteristic resistance of a pulse generating network. Furthermore, the switching elements which are capable of switching voltages and currents according to a given application, are often lacking.

The use of high-power pulse transformers, which may also be referred to simply as pulse transformers, offers a possibility of circumventing such technical difficulties. The possible functions of such devices are, inter alia: current matching, voltage matching, impedance matching, potential separation, and potential reversal.

Several applications of such devices will be discussed in detail below. When charging a pulse-generating network with dielectric liquid, as is described in European patent application No. 0 024 576, which is publication (2) listed below, especially in FIG. 11 thereof, it would be technically advantageous for the charge to come from a thyristor-switched power supply. Thyristors can switch relatively high currents at low holding voltages. The pulse-generating network is to be charged to voltages of several tens of kV in the μsec range In order to match the low voltage in the thyristor circuit to the high-voltage in the pulse-generating network, a resonance transformer, such as is described in publication (3) listed below, may be used. However, in this specific case the charging time of the pulse-generating network is several milliseconds. In order to achieve charging within a few μsec, it is necessary to employ a pulse transformer with a leakage inductance that is reduced to a minimum.

Due to the high leakage inductances which are inherent in the structure of conventional high-voltage transformers, they cannot transform the specified energies in that short period of time. Another requirement is the ability to operate the transformer at high repetition rates, which are also referred to by the abbreviation PRR (Pulse Repetition Rate). The problem of effectively dissipating heat developing in devices which must be compact, is then encountered.

Regarding the problems involved in the field of application of high-power transformers of the above-described type, reference must also be made to supplying an X-ray flash tube in order to generate high-intensity X-ray pulses in the submicrosecond range, especially at high repetition rates. In the trigger circuit for the X-ray flash tube, both the pulse-generating network and the switching element may be structured for the required X-ray tube acceleration voltage, as seen in publications (4), (5) and (6) listed below. The disadvantage of these conventional devices lies in the required high dielectric strength of the components and the accompanying technological difficulties, especially at high repetition rates.

Another possibility for triggering an X-ray tube is to tap the supply pulse for the X-ray tube at the secondary side of a pulse transformer. Descriptions of such devices can be found in publications (4) and (7). In such a method, difficulties are encountered when energies that are as high as possible are to be transformed in the shortest possible time In order to increase the cut-off frequency of a transformer for such high voltages and simultaneous low impedance, a very close coupling for reducing the internal voltage drop and the least possible leakage inductance, are desirable. This necessitates minimization of the insulating spacings between secondary and primary windings and between the core and the windings, which leads to extremely high electrical field strengths because of the high voltages.

While the high-power pulse transformer according to publication (1) listed below which is the starting point for the invention of the instant application, already has the desired short pulse length it must be noted that the transformation ratio drops considerably at relatively high load resistances, relative to the no-load transformation ratio. Other technical disadvantages of this conventional pulse transformer become apparent, especially at high voltages and during continuous operation. Given the electrical field strength which must be very high and the short rising time pulses, corona effects appear even in carefully selected and processed dielectrics, resulting in irreparable destruction of the dielectric and accordingly the failure of the transformer. Additionally, at high repetition rates and high mean outputs, a solid dielectric would render the dissipation of unavoidably developing heat from the soft magnetic core, extremely difficult.

The general problem underlying the invention deals with overcoming the difficulties occurring in high-power pulse transformers according to publication (1) listed below, which further reduces the leakage inductance of the prior art, which avoids the corona effects or increases the dielectric strength and which improves the heat dissipation.

This general problem also applies to another conventional pulse transformer according to publication (8) listed below, which is formed of an assembly of stacked, lamellar windings with dielectric layers therebetween. In this case as well, the problem of dielectric strength is also present because electrical field strength at the edges of the lamellar conductors automatically lead to early destruction during extended operation, due to corona effects. Additionally, the boundary surfaces between the solid dielectric and the conductors are considerably stressed mechanically by current forces, which also lead to electrical punctures. Therefore, the leakage inductance which must be relatively low, cannot be utilized and the electrical insulation is too prone to trouble.

It is accordingly an object of the invention to provide a high-power pulse transformer for short high-voltage and/or high-current pulses, which overcomes the hereinafore-mentioned disadvantages of the heretofore-known devices of this general type for short high-voltage and/or high-current pulses which, beyond the general objects:

is usable for current matching, voltage matching, impedance matching, potential separation and potential reversal, in other words especially for a so-called "step-up" transformer which generates pulses of higher voltages at optimal power transformation, but is also a so-called "step-down" transformer which generates short pulses of very high amperage, while high-voltage pulses are transformed down and fed into a very low-resistance load. While the iron losses outweigh the copper losses in the step-up transformers, the losses in the conductors must be kept low in the step-down (current) transformers, by optimizing the winding cross sections;

is suitable for supplying an X-ray flash tube for generating X-ray pulses in the submicrosecond range with high intensity and especially at high repetition rates; and has a sufficiently high cut-off frequency at simultaneously low internal resistance, when operated as a step-up transformer, in particular for triggering an X-ray flash tube, while the undervoltage and overvoltage windings are very closely coupled, with the least possible leakage inductance at the same time.

SUMMARY OF THE INVENTION

With the foregoing and other objects in view, there is provided, in accordance with the invention, a high-power pulse transformer for short, high-voltage and/or high-current pulses, preferably for high-power laser circuits, comprising:

a container having walls, a base plate disposed in the container, high-voltage leadthroughs disposed in the container walls, an insulating, cooling dielectric liquid disposed in the container, said dielectric liquid having a given heat transfer coefficient $\alpha[w/m^m \cdot K]$ with respect to an uncoated metal wall within the range of $\alpha_1 \leq \alpha \leq \alpha_2$, said uncoated metal wall comprising by definition a metal wall being covered by a thin oxide or lacquer film within the $\mu$m-range, the influence of which on the heat transfer coefficient or on the dielectric properties of the couple "metal wall - dielectric liquid" being negligible;

at least one magnet core disposed on the base plate in the container, the magnet core having a central window formed therein defining an axis of the window and defining self-enclosed magnet legs disposed around the central window, the core having relatively wide sides normal to the axis of the window and relatively narrow sides;

at least one undervoltage winding and at least one overvoltage winding each being disposed in the dielectric liquid, being wrapped in each other around parts of the magnet core immersed in the dielectric liquid and being linked to the magnet core and to each other, the windings including turns of substantially mutually doubly-wound electrically insulated metallic conductors having a given thickness and having terminal winding ends disposed in the leadthroughs, the conductors having surfaces with a heat transfer coefficient $\alpha$ with respect to said dielectric liquid being within said range $\alpha_1 \leq \alpha \leq \alpha_2$; being higher than the the turns of each of the windings being self-supported or cantilevered and spaced apart from turns of the other of the windings by a first minimum spacing and being spaced from the magnet core by a second minimum spacing;

support insulators being partly disposed in the dielectric liquid and being adjacent and spaced from at least one of the sides of the magnet core by a third minimum spacing being greater than the sum of the second minimum spacing and the given thickness of the turns, at least the ends of the windings being secured in recesses formed in the support insulators; and means for retaining the magnet core and the support insulators on the base plate in the container.

In accordance with another feature of the invention, there are provided support and terminal points disposed on the support insulators at the recesses;

the windings each being in the form of a winding helix and each being divided into smallest winding units each including at least one undervoltage winding and at least one overvoltage winding in the form of winding branches having mutually adjacent turns each surrounding an associated magnet leg and being mutually spaced apart by the first minimum spacing and being mutually parallel as viewed in axial direction of the winding helix;

the winding ends of a multiplicity of the parallel smallest winding units being connected to the support and terminal points on the support insulators; and the conductors of a given number of the smallest winding units of the undervoltage and overvoltage windings being connected to the support and terminal points for attaining a desired transformation ratio.

In accordance with a further feature of the invention, each one of the support insulators is associated with a respective wound magnet core leg or is associated with each respective wide side of the magnet core.

In accordance with an additional feature of the invention, the support insulators are plate-shaped.

In accordance with still another feature of the invention, the winding ends of the smallest partial winding units formed of the winding branches of the undervoltage winding are supported by and connected to one of the support insulators, and the winding ends of the smallest partial winding units formed of the winding branches of the overvoltage winding are supported by and connected to another of the support insulators.

In accordance with still a further feature of the invention, at least one of the windings carries high current and the conductor turns and the conductors are hollow and are cooled from the inside by a liquid coolant.

In accordance with still an additional feature of the invention, the secondary winding carries high current and is formed of parallel partial winding units having hollow conductor turns and conductors and the primary winding carries high voltage and is formed of mutually series-connected partial winding units formed of hollow turns and conductors.

In accordance with yet another feature of the invention, the core is rectangular or may have a double U-shape or may have a UI-shape.

In accordance with yet a further feature of the invention, the core is annular or is oval.

In accordance with yet an additional feature of the invention, the conductors are formed of a good conducting material having a specific resistance of $0.016 \leq \rho[\Omega \times mm^2/m] \leq 0.029$ at 20° C. and the surfaces of the conductors have a structure within the band width which is bare metal with a thin oxide skin.

In accordance with a concomitant feature of the invention, the conductors are formed of a good conducting material having a specific resistance of $0.016 \leq \rho[\Omega \times mm^2/m] \leq 0.029$ at 20° C. and the surfaces of the conductors have a structure within the band width which is bare metal with a thin protective lacquer film.

The advantages attainable by practicing the invention are to be seen primarily in that the dielectric strength and heat dissipation problems inherent in high-power pulse transformers are basically solved. The subject of the invention is characterized by the following features:
(1) high dielectric strength;
(2) extremely close coupling;
(3) low leakage inductance and high cut-off frequency;
(4) low winding resistance and high current amplitudes;
(5) non-problematic heat dissipation;
(6) excellent reliability and long life.

The factor that contributes especially to the attainment of these favorable properties is that, particularly in locations of high electrical field strength, all solid dielectric insulation can be dispensed with. All of the windings have self-supporting or cantilevered structures; this is understood to mean that the individual turns of the overvoltage and undervoltage windings, due to their suitable cross section, have sufficiently stiff or rigid spirals which retain their shape and are merely fixed or "secured" at the terminal ends of the smallest winding units on the support insulators without being supported by each other or by the core. The insulation is formed of a dielectric liquid. Transformer oil or fluoridated hydrocarbon are suited for this purpose. The windings and the magnet core, each of which are supported by separate support structures, are immersed in the fluid. The dielectric or insulating liquid eliminates all problems dealing with the dissipation of the heat from the magnet core, from the dielectric itself and from the windings, such as by intrinsic convection or by forced circulation in a closed circuit equipped with a heat exchanger. Technically, it presents no problem to attain high voltages while simultaneously using a compact construction because of the high insulating powers of the dielectric liquid. Corona formation is prevented because the liquid sufficiently wets the conductors which are either bare or at most have a thin oxide film or protective lacquer film. Should a voltage spark-over nevertheless occur in the transformer, the liquid dielectric has a self-healing effect. The cantilevered or self-supported construction facilitates a bifilar or doubly-wound configuration of primary and secondary windings (undervoltage and overvoltage windings), which is a prerequisite for least possible leakage inductance. A suitable core material for the transformers is ferrite, for example. By using so-called metallic glasses, as seen in publication (9) listed below, it is possible to construct even more compact transformers for still higher voltages, due to the high saturation inductance of these materials.

Other features which are considered as characteristic for the invention are set forth in the appended claims.

Although the invention is illustrated and described herein as embodied in a high-power pulse transformer for short high-voltage and/or high-current pulses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

DESCRIPTION OF THE PREFERRED EMBODIMENTS

Figure 1:
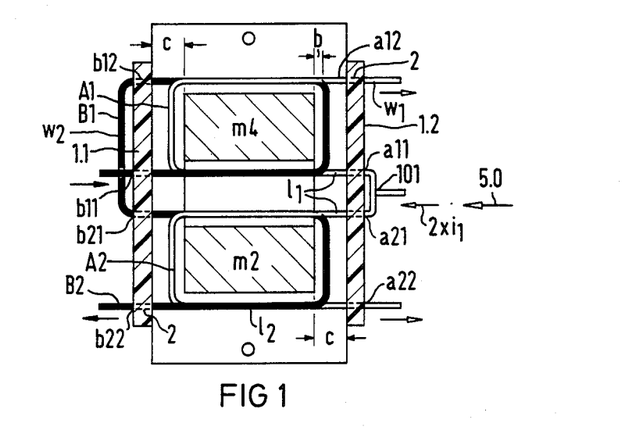
FIG. 1 is a simplified, diagrammatic, cross-sectional view of the magnet core and the support insulators of a first embodiment of a high-power pulse transformer (hereinafter referred to as a pulse transformer for short) according to the invention, taken along the line I—I in FIG. 2, in the direction of the arrows.
Figure 2:
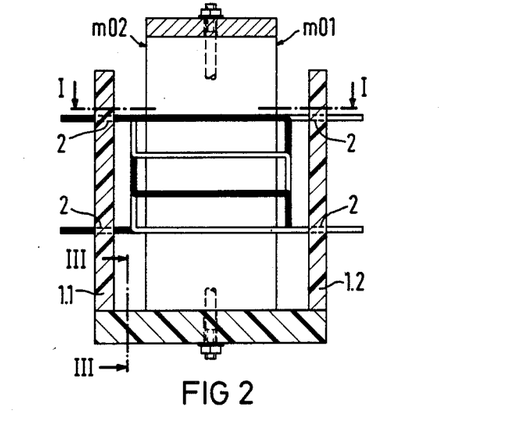
FIG. 2 is a partially sectioned, front-elevational view of the device shown in FIG. 1.
Figure 3:
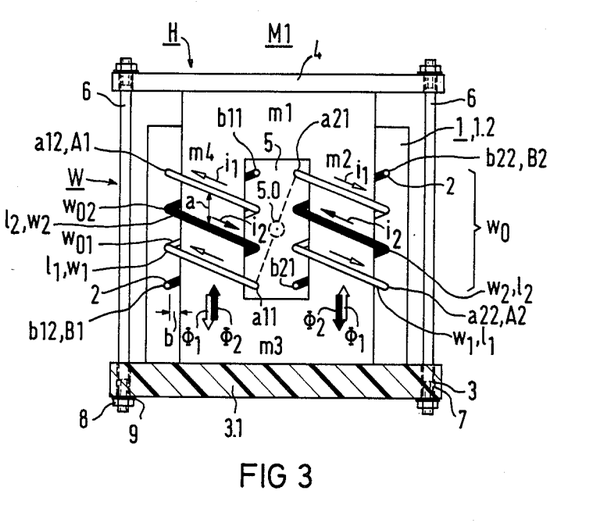
FIG. 3 is a side-elevational view of the pulse transformer according to FIGS. 1 and 2 with one support insulator removed, which is partly sectioned along the line III—III in FIG. 2, in the direction of the arrows.

Referring now to the figures of the drawings in detail and first, particularly, to FIGS. 1–3 thereof, there is seen a self-supporting or cantilevered winding of a pulse transformer which is designated as a whole with reference symbol W, while a primary winding has symbol $w_1$ and a secondary winding has symbol $w_2$. The primary winding $w_1$ and the undervoltage winding are identical if a primary voltage $u_1$ is smaller than a secondary voltage $u_2$, in which case the secondary winding and the overvoltage winding are also identical This applies to a so-called voltage or step-up transformer, whereas in a current (step-down) transformer, a higher voltage low current fed to the primary winding is transformed up into a low voltage higher current on the secondary side. In the latter case, the primary voltage is the overvoltage and the secondary voltage is the undervoltage.

The self-supporting or cantilevered windings $w_1$, $w_2$ each require a support structure, which is designated with reference symbol H as a whole, for a magnet core M1, for the primary winding $w_1$ for the secondary winding $w_2$. The magnet core M1, which is preferably a ferrite core, i.e a core made of highly-permeable material, is constructed as a rectangular core with closed magnet legs m1, m2, m3, m4 that are disposed around a central window 5, so that the two broad sides of the magnet core M1 (hereinafter referred to as the "core" for short) have axes which are normal to the axis 5.0 of the window.

The core M1, i.e. in this case its two legs m2 and m4, is surrounded by the above-mentioned winding W. The primary winding $w_1$ and the secondary winding $w_2$ are each linked to the core M1 and to each other, and electrically insulated, metallic conductors $1_1$, $1_2$ for turns $w_{01}$ of the primary winding $w_1$ and for turns $w_2$ of the secondary winding $w_2$ are largely bifilar or doubly-wound relative to each other As already stated above, the primary and the secondary winding are identical with the undervoltage and overvoltage winding in a voltage transformer, and are therefore referred to hereinafter as O-winding and U-winding for short In this context and below, the term bifilar or doubly-wound is understood to mean that the current paths of the winding conductors $1_1$, $1_2$ turns $w_{01}$, $w_{02}$ are so closely adjacent and parallel to each other that the magnetic leakage fields generated by currents flowing through them cancel each other out to the greatest possible extent.

According to the invention, the outer surfaces of the coil conductors $1_1$, $1_2$ of the primary and secondary coils, or of the U and O coils $W_1$, $W_2$, are preferably formed of a good conducting material with a specific resistance, especially $0.016 \leq \rho[\Omega \times mm^2/m] \leq 0.029$ at 20° C. and have a high heat transfer coefficient $[\alpha] = [W/m^2 \times K]$ with respect to the liquid dielectric flushing them. In other words, the conductors have a surface structure within the bandwidth which is metallically bare down to a thin oxide skin or a thin protective lacquer film. The thin oxide skin (of aluminum conductors) or the thin protective lacquer film must not significantly impair the heat transfer from the metallic coil conductor to the liquid dielectric. This thin, yet still permissibly thick oxide skin or protective lacquer film which is in the $\mu$ range or less, cannot act as a solid dielectric which heats up. This is because the field strength component affecting it is in the order of magnitude of a few volts. Assuming that a high voltage of e.g. 30 kV prevails between the upper end of the secondary winding and a ground spaced 30 mm therefrom (e.g. a grounded metal housing wall), this would correspond to a field strength of 1 kV/mm. The dielectric strength of transformer oil is $\approx$ 12 kV/mm. An oxide skin which is 1 $\mu$ thick would then have a potential of 1 V. This precludes corona problems or the like which could occur with a solid, thicker dielectric. If the relative dielectric constant of the thin oxide skin or protective lacquer film is greater than that of the liquid dielectric, the proportional field strength would be even smaller, because in each boundary surface of dielectric or electrically insulating layers, the electrical field strength suffers a jump in inverse proportion to the dielectric constant (DK). This means that the electrical field strength increases suddenly when the dielectric constant increases, and vice versa.

As far as the heat transfer from the surface of the primary or secondary winding to the liquid dielectric flushing them is concerned, the Newton formula $$Q = \alpha \times A \times t \times \Delta\theta$$

applies generally, wherein
Q = amount of heat crossing the boundary surface in Joules or W's,
$\alpha$ = heat transfer coefficient (see above),
A = size of the transfer area in $m^2$,
t = transfer time in seconds, and
$\Delta\theta$ = temperature difference between liquid dielectric and the surface of the winding $W_1$ or $W_2$ in K.

The values for $\alpha$ can be determined with sufficient accuracy merely by experimentation: they are based on complicated thermodynamic processes. Therefore, only ranges for approximate values are given below:

| | Type of heat transfer | | | |
|---|---|---|---|---|
| | Thermoconvection (static liquid on metal wall) | | Forced circulation (liquid circulated) | |
| Dielectric | Transformer oil | Carbon fluoride | Transformer oil | Carbon fluoride |
| Heat transfer coefficient $\left(\dfrac{W}{m^2 K}\right) \times 10^{-2}$ | 1.6–2.3 | 2.4–3.2 | 1.7–15.9 | 2.3–26.0 |

These $\alpha$ values must not be significantly worsened by the oxide skin or protective lacquer film, as already indicated above.

Figure 4:
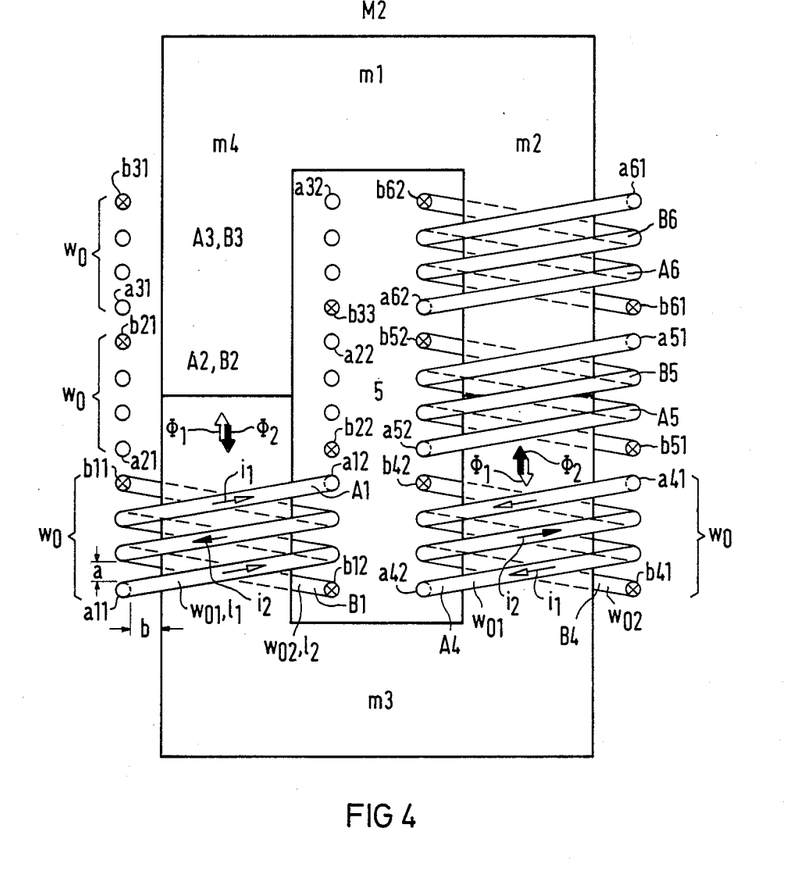
FIG. 4 is a greatly simplified front-elevational view of a second embodiment of the invention, showing only the magnet core and some of the smallest winding units; one leg of the transformer core being equipped with the three smallest coil units, each comprising two turns on the overvoltage or undervoltage side.

In the example shown, they are formed of round or rectangular copper conductors with $\rho = 0.017 \Omega \times mm^2/m$ at 20° C., the turns enveloping a rectangular area, as seen in detail in FIG. 4 which is yet to be discussed. The outer surface of the coil conductors may also have an anodization, a protective lacquer or the like, if the heat transfer coefficient $\alpha$ and/or the dielectric strength reach the required minima.

As mentioned above, the individual turns $W_{01}$, $W_{02}$ of the primary and secondary windings $W_1$, $W_2$ are cantilevered or self-supporting, and are provided with a first minimum mutual spacing a between the turns $W_{01}$–$W_{02}$ seen in FIG. 3 and a second minimum spacing b from the core M1 which they envelope, as seen in FIGS. 1 and 3. In the illustrated embodiment, $a \approx 2 \times b$. These minimum spacings a, b depend upon the field strength prevailing in the liquid dielectric, which will be discussed below, and upon the dielectric strength of the dielectric itself In addition, it is clear primarily from FIG. 3 that the turns $w_{01}$, $w_{02}$ of the primary and the secondary windings $w_1$, $w_2$ are bifilarly or doubly-wound and nested in each other This configuration may be imagined as having originated with a spiral for each winding $w_1$ and $w_2$ of the same coil diameter being screwed into each other, so that the turns $w_{01}$ of the primary winding $w_1$ alternate with the turns $w_{02}$ of the secondary winding $w_2$, as viewed in axial direction of the spiral.

Plate-shaped support insulators 1.1 and 1.2 which are designated in common with reference numeral 1, are disposed at a third minimum distance c from the core M1, and are adjacent at least one of the sides of the core M1; in the present case they are adjacent two wide sides m01, m02. The third minimum distance c is greater than the sum of b+d, where d is the conductor thickness of the turns $w_{01}$, $w_{02}$. A practical value for c lies in the range $(b+d)<c<2\times(b+d)$, as may be learned from FIGS. 1 and 2, because in that case a good convection and/or forced flow can develop in the liquid dielectric for the purpose of cooling the windings in the space between the two support insulators 1.1 and 1.2.

In the embodiment according to FIGS. 1 and 3, a smallest winding unit $w_0$ is wound on each of the two legs m2 and m4 of the rectangular core M1 (the phrase "wound on" in this context means that the turns $w_{01}$, $w_{02}$ wrapped around the legs, but are not seated on the legs, nor do they touch the legs). Each one of the two smallest winding units $w_0$ includes a configuration of turns A1, A2 being equal to approximately two turns $w_{01}$ of the primary winding $w_1$ turns B1, B2 being equal to approximately two turns $w_{02}$ of the secondary winding $w_2$ which are nested in each other as shown. The turns $w_{01}$, $w_{02}$ are free standing in space, as it were, except for the ends of the smallest winding units which, in the case of the primary winding $w_1$, are designated by reference symbols a11, a12 in the branch A1 and with reference symbols a21, a22 in the branch A2. In the case of the secondary winding $w_2$, the ends are designated with symbols b11, b12 in the branch B1 and with symbols b21, b22 in the branch B2. The configurations of turns, or the smallest winding units A1, A2; B1, B2 are referred to as branches below. The ends a11 to a22 of the branches A1, A2 of the primary winding $w_1$ and the ends b11 to b22 of the branches B1, B2 of the secondary winding $w_2$ of the smallest winding units $w_0$, are at the same time terminal ends for connecting an electrical switching circuit; they are pulled through holes at support and terminal points 2 in the support insulators 1.1, 1.2 and "secured" in these holes, i.e. fixed without play. Terminals and leadthroughs which are not shown in FIGS. 1 to 3 are part of this fixation.

In the embodiment according to FIGS. 1 and 3, The branches A1, A2 of the two winding units $w_0$ of the primary winding $w_1$ are mutually parallel, whereas the branches B1, B2 of the two winding units $w_0$ of the secondary winding $w_2$ are connected in series, so that on the primary side, $n_1=2$ turns $w_{01}$ are series-connected while on the secondary side $n_2=4$ turns are connected thus resulting in a transformation ratio of $u=n_2/n_1=4/2=2$ with the same number of turns of the two smallest winding units, in which $w_{01}$ and $w_{02}$ each refer to one turn.

It is evident, particularly from FIG. 3, that the winding conductors $1_1$ of the primary winding $w_1$, which are shown in white in the winding unit $w_0$ at the left, are wound in a rising, left-handed or counterclockwise spiral around the leg m4, starting at the winding end a11 of one of the two parallel branches A1. A partial primary current $i_1$ flowing through the conductors in this direction, is indicated by current arrows $i_1$ with clear arrowheads and a flux direction $\Phi_1$ directed downwardly in the magnet leg m4 and is also indicated by a framed arrow. At a soldering point or terminal 101 shown in FIG. 1, a primary current $2xi_1$ is fed in and then is divided into the partial currents $i_1$ at each of the two winding branches A1 and A2 of the primary winding $w_1$ shown in FIG. 1. In the case of the left winding branch A1 in FIG. 3, the primary current follows a path from the lower winding end a11 to the upper winding end a12: in the case of the second winding branch A2 of the primary winding, as seen in FIG. 3 at the right magnet leg m2, the partial primary current $i_1$ follows a path from the upper winding end a21 to the lower winding end a22. It is clear from this discussion that as viewed from above, the second branch A2 of the primary winding is wound around the magnet leg m2 in a descending, left-handed or counterclockwise spiral and that the partial primary current $i_1$ also flows through it in this direction. Consequently, the resultant direction of flux $\Phi_1$ is oriented in the same direction as that in the left magnet leg m4.

As mentioned above, the two branches B1 and B2 of the secondary winding $w_2$ are connected in series Starting at the upper winding end or terminal point b11, the first winding branch B1 of the secondary winding $w_2$, shown in solid black lines, is wound around the magnet leg m4 in a left-handed or counterclockwise helix, as viewed from above, and the partial secondary current $i_2$ which is indicated by black current arrows also flows through in this direction, to the terminal point or end b12 of the first winding branch B1. Therefore, as seen in FIG. 1, the conductor $1_2$ is led around to the outside of the support insulator 1.1 up to the fixed point or end b21 of the second winding branch B2 of the secondary winding $w_2$ which is located in the lower reaches of the magnet leg m2, as seen in FIG. 3.

From there on, the second winding branch B2, as viewed from below, is wound around the magnet leg m2 in ascending, lefthanded or counterclockwise helixes, and the partial secondary current $i_2$ indicated by black arrows, also flows through it in this direction to the winding end or terminal and fixed point b22. The associated direction of flux $\Phi_2$ is symbolized by solid black arrows. This means that the directions of the flux $\Phi_2$ in the left leg m4 and in the right leg m2 coincide; but they are each opposite to the directions or the flux $\Phi_1$. The leading around of the winding conductor $1_1$ on the outside of the support insulator 1.2 is indicated in FIG. 3 by the broken line between the terminal points or ends a11 and a21, since this bridging in the vertical direction is not visible in FIG. 1.

The support structure or means H are provided for the retention of the core M1 and of the two support insulators 1.1, 1.2 on a base plate 3 within a container, tank, vessel or the like containing the dielectric fluid, which is not shown in FIGS. 1 to 3. The support structure or means H is formed of a retaining yoke 4 on the cover or deck side and tie rods 6 which push the retaining yoke 4 against the cover or deck side of the core M1, and therefore push the core against the base plate 3. The tie rods 6 pass through holes 7 formed in the base plate 3 which has a rectangular cross section in particular and through holes in the somewhat narrower retaining yoke 4 which also has a rectangular cross section. The tie rods are tightened by means of tightening nuts 8 at two threaded ends thereof. The tightening nuts 8 are equipped with washers 9. The tie rods 6 may be constructed, in particular, as shoulder screws, in which case a separate anti-rotation safety device can be omitted. It is also possible to make the holes 7 in the base plate tapped holes or tapped blind holes, in which case the lower nuts 8 can be omitted. The retaining yoke 4 is formed of a diamagnetic material such as brass or a suitable plastic, such as GFK (fiberglass reinforced plastic), so that no paths for parasitic secondary fluxes can develop. The tie rods or tension rods 6 may be formed of corrosion-resistant steel. The base plate is also formed of insulating material such as Pertinax or acrylic glass.

The plate-shaped support insulators 1.1, 1.2 are disposed at the above-mentioned third minimum distance c from the core M1, are parallel to the plane of the wide sides of the core and are fastened to the base plate 3, such as by cementing in the vicinity of lateral surfaces 3.1 of the base plate 3 which is shaded in FIG. 3. The upper ends of the support insulators 1.1, 1.2 may even be interconnected by non-illustrated connecting strips so that a largely rigid insulator structure is formed. The material for the support insulators 1.1, 1.2 is a high-grade insulator such as Pertinax or acrylic glass. Basically, it would also be possible to provide a plate-shaped or differently-shaped support insulator 1 on only one side or wide side of the magnet core M1 which would then have to fix the winding ends or winding starts of the smallest winding units $w_0$ in place; however, the illustrated structure with two support insulators, each assigned to the broad side of the core M1, is more versatile and facilitates the terminal connection and the wiring of the individual smallest winding units. This is important because an increase in the total number per core permits the use of a correspondingly greater number of different transformation ratios. This makes it possible to vary the transformation ratio and the number of turns both primarily and secondarily, through the use of mixed series and parallel wiring. In other words, through the use of appropriate combinations of winding elements, different voltages at different internal resistances can be produced as in conventional transformers with several windings.

As mentioned above, in the embodiment shown in FIGS. 1 to 3, the number of primary turns is $n_1 = 2$, and the number of secondary turns is $n_2 = 4$, resulting in the transformation ratio $u = n_2/n_1 = 2$.

The simplified embodiment of FIGS. 1 to 3 already clarifies the principle of the combination of the smallest winding units $w_0$. Each of the winding units is formed of at least one undervoltage and at least one overvoltage winding configuration in the form of the branches A1, B1 and A2, B2. The primary turns $w_{01}$ and secondary turns $w_{02}$ of these branches, which are mutually adjacent, spaced apart by the first minimum spacing a and parallel to each other, envelope the associated magnet leg m4 or m2, as seen in the axial direction of the winding helix. The winding ends (or winding starts) a11 to a22 and b11 to b22 of a multiplicity of such smallest winding units $w_0$ with their turns $w_{01}$, $w_{02}$ wound parallel, are led to the recesses or holes at support and terminal points 2 of the support insulators 1.1, 1.2. It is at or near the holes at support and terminal points 2 of the support insulators 1.1, 1.2 where the internal wiring of the selected number of winding units $w_0$ is made to the overvoltage and undervoltage windings $w_2$ or $w_1$ for the attainment of the desired transformation ratio u.

The just described principle of the configuration of a multiplicity of similar, smallest winding units as well as their wiring to the primary and secondary winding, is explained once more below by way of the second embodiment of the invention according to FIG. 4. In this embodiment again, a rectangular core with the two mutually opposite shorter legs m1, m3 and the mutually opposite longer legs m2, m4 is provided, including the central window cutout 5. Each one of the two longer legs m2, m4 supports three smallest winding units $w_0$ having primary turns $w_{01}$ and secondary turns $w_{02}$ which are each wound bifilarly or doubly around the magnet legs at a mutual spacing a and at a distance b from the magnet legs. Each winding unit $w_0$ has two primary turns $w_{01}$ and two secondary turns $w_{02}$, and the series-connected primary turns $w_{01}$ for each winding unit $w_0$ are again referred to as winding branches or "branches" for short and are designated with reference symbols A1 to A6 in the case of the winding branches on the primary side and with reference symbols B1 to B6 in the case of the winding branches on the secondary side. In two of the smallest winding units $w_0$ of the leg m4, the turns are not shown in detail it goes without saying that they are disposed in the same manner as the rest of the winding units. the winding branch A1 on the primary side has the two winding ends a11, a12, and the winding branch B1 disposed bifilarly to or doubly-wound with the winding branch A1, has the two winding ends (or starts) b11, b12. The designation of all of the other five smallest winding units $w_0$ is carried out in such a way that the smallest winding unit $w_0$ to which the winding branches A6 and B6 belong has winding ends a61, a62 on the primary side and winding ends b61, b62 on the secondary side. The white or clear outlined current arrow $i_1$ within the primary turns $w_{01}$ and the solid black current arrows $i_2$ within the secondary turns $w_{02}$ are shown for the two lower winding units. It is obvious, when viewed from below, that the primary turns $w_{01}$ of the left leg m4 are ascending, right-handed helixes and that the partial primary current $i_1$ also flows through them in this sense, resulting in the flux direction $\Phi_1$ indicated by the clear or white arrows according to the screw rule, whereas the secondary turns $w_{02}$, when viewed from above, are descending, right-handed helixes and the partial secondary current $i_2$ also flows through them in this sense, resulting in the flux direction $\Phi_2$ indicated by the solid block arrows opposite to the flux direction $\Phi_1$. On the right leg m2, the primary and secondary turns $w_{01}$, $w_{02}$ are disposed and oriented in such a way that the fluxes $\Phi_1$ and $\Phi_2$ linked to them and resulting from the partial currents $i_1$ and $i_2$ flowing through them, have the same direction in the circulatory sense of the core M2 as the fluxes in the left leg m4, which is a natural conclusion when looking at the right half of FIG. 4 and applying the screw rule. Of course, the configuration according to FIG. 4 is much more versatile than that according to FIGS. 1 to 3 because, for example, the branches A1 to A6 on the primary side can all be mutually parallel, or parallel in two groups or in three groups; correspondingly, the branches B1 to B6 on the secondary side can all be connected in series, or in three groups of two each, or in two groups of three each, for example. This makes the desired transformation ratio u adjustable, and the pulse transformer can be operated as a voltage transformer or as a current transformer. The winding ends a11 to a62 and b11 to b62 are again conducted through cutouts or holes which are not shown in FIG. 4, in the support insulators and are fixed therein, with appropriate non-illustrated terminals to be provided on the outside.

Figure 5:
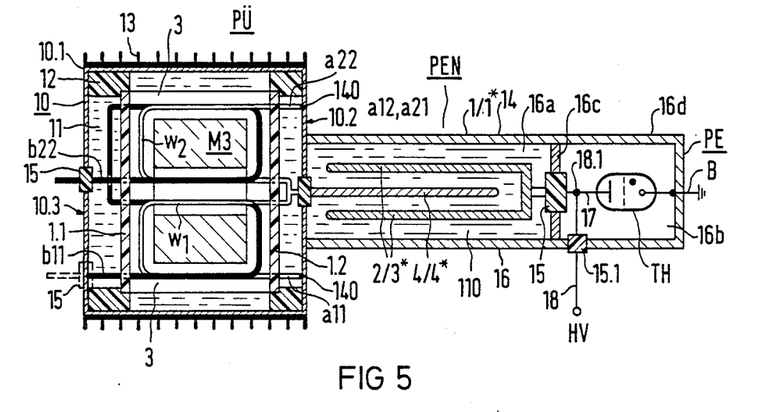
FIG. 5 is a view of the pulse transformer according to FIG. 1, physically assembled in a pulse-generating network in a Blümlein circuit with a thyratron as a high-voltage switch it being possible to connect an X-ray flash tube to the secondary side of the pulse transformer.
Figure 7:
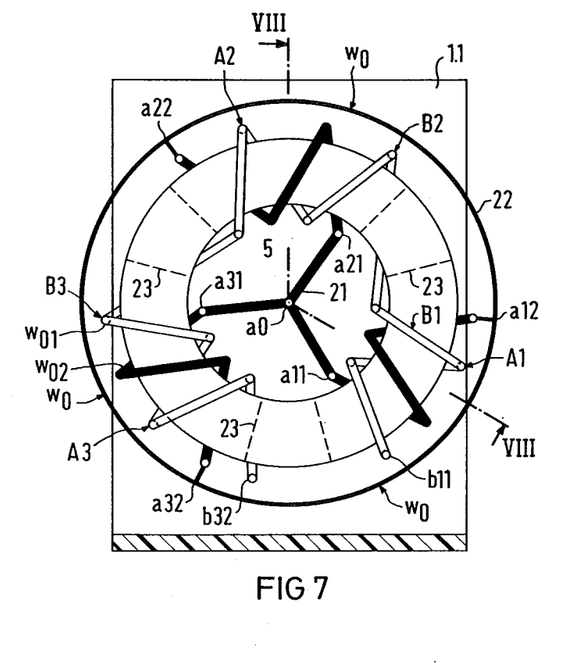
FIG. 7 is a view similar to FIG. 3 of a third embodiment of the invention with a ring core pulse transformer.
Figure 8:
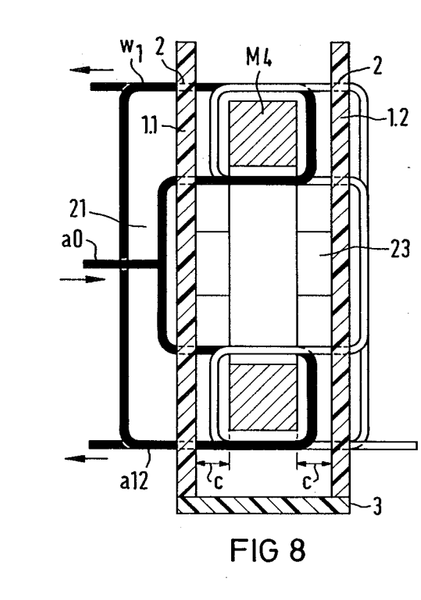
FIG. 8 is a cross-sectional view taken along the line VIII—VIII in FIG. 7, in the direction of the arrows.

In the third embodiment according to FIG. 5, the pulse transformer with the construction according to FIGS. 1 to 3 or FIG. 4 or with a construction as a ring core transformer is shown in FIGS. 7 and 8 and which is yet to be described, is housed in a hermetically closed tank 10 filled with transformer oil or with fluoridated hydrocarbons as a liquid, cooling dielectric 11. It is assumed for the actual embodiment according to FIG. 5 that the core M3 is a rectangular core that is held centrally inside the tank 10. The core is held by perforated corner brackets 12, only four of which are visible in the illustration according to FIG. 5, by an upper and a lower base plate, by non-illustrated tie rods or the like, and by the two support insulators 1.1, 1.2, each of which are located on a broad side of the core M3. In addition to the corner brackets that are shown, more non-illustrated corner brackets or supporting blocks may be coordinated with all of the twelve edges of the cuboid or cubic configuration of the pulse transformer. The perforations in the corner brackets 12 should be provided in such a way as not to hinder the convection flow of the dielectric 11. Furthermore, diagrammatically indicated cooling ribs 13 disposed on the outer surface 10.1 of the tank 10 serve for heat dissipation. Generally, when low viscosity fluoridated hydrocarbons are used, their intrinsic convection suffices for heat dissipation, whereas forced convection by means of a circulating pump with appropriate non-illustrated oil inlet and outlet lines is recommended when transformer oil is used.

The pulse transformer according to FIG. 5 is designated by reference symbol PU as a whole; it is integrated with a pulse generator PE in order to form one assembly. This means that the metal tank 10 of the pulse transformer PU is joined to a metallic housing 14 of the pulse generator PE so as to be metallically conducting and mechanically rigid. A comparison of FIGS. 5 and 6 reveals that the winding terminals a11 and a22 of the primary winding $w_1$ are in metallically conducting contact with the outer or surface wall 10.2 of the tank 10 at contact points 140, and that the upper or high terminal b22 of the secondary winding $w_2$ is led to the outside through an opposite outer or surface wall 10.3 while being insulated from high-voltage by means of a high-voltage leadthrough 15. The other winding end b11 of the secondary winding $w_2$ can also be metallically conductingly connected to the outer or surface wall 10.3 if grounded, or else if the secondary winding is not grounded, it can also be led to the outside through a lead-through insulator 15 which is secured against high voltage. Therefore, the leadthrough 15 of the winding terminal b11 is shown in broken lines.

Figure 6:
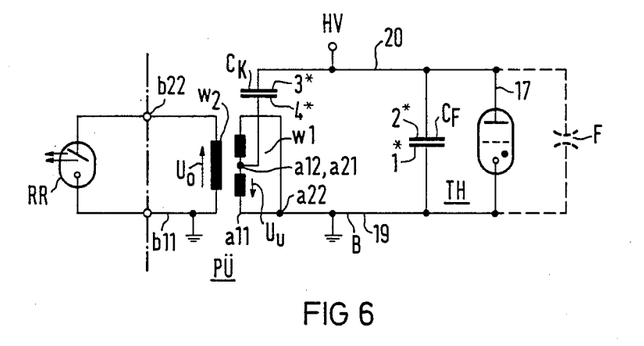
FIG. 6 is a schematic circuit diagram of the assembly according to FIG. 5, supplemented by an X-ray flash tube connected to the secondary side of the pulse transformer, including a spark gap indicated by broken lines, which serves as a rapid high-voltage switch, as an alternative to the thyratron.

A comparison of FIGS. 5 and 6 also reveals that the pulse generator PE contains a Blümlein circuit the rectangular, metallic housing 14 of the pulse generator is connected to the tank 10 as mentioned above and is divided into two chambers 16a and 16b. The chamber 16a contains metallic capacitor plates 2/3* having a U shape and a capacitor plate 4/4* disposed between the legs of the U, while the outer metallic housing forms a capacitor coating or capacitor plate 1/1*. These designations 1/1*, 2/3* and 4/4* coincide with the designations 1* and 2* of a first strip line capacitor $C_K$ of FIG. 6. The Blümlein circuit for pulse-generating networks is known in the art and is shown and described in detail, for instance in publication (2) or in publication (10) as listed below.

Serving as a quick high-voltage switching path or contact break distance is a thyratron TH, having an anode 17 which according to FIGS. 5 and 6, is connected to the plate or coating 2/3* that is common to both strip line capacitors $C_K$ and $C_F$. The anode passes through another high-voltage leadthrough 15 in a partition wall 16c; the cathode, on the other hand, is connected to the metallic housing wall 16d of the chamber 16b, and the chamber 16b is again grounded, as seen by the diagrammatically illustrated terminal B at ground potential. The high voltage HV is fed through a high-voltage line 18 passing through the metallic wall 16d of the chamber 16b, by means of another leadthrough 15.1 and is connected to the anode at a node 18.1.

A pulse-generating network PEN of the pulse generator PE contained in the chamber 16a and formed by the housing wall 16 operates with water or with an ethylene/glycol/water mixture or even with pure ethylene glycol as a dielectric 110 and is charged by a non-illustrated pulse charger. The metallic chamber walls 16d of the chamber 16b accommodating the switching element (thyratron TH) act as current return.

A general high-voltage switching path or contact break distance in the form of a spark gap F parallel to the switching element TH, is also indicated in broken lines in FIG. 6 in order to express that the pulse transformer PU is not restricted to the use of thyratrons. In FIG. 6, the connection to ground potential is again designated with reference symbol B, the connection to the high-voltage source is designated with reference symbol HV, the ("lower") bus that is normally at ground potential is designated with symbol 19 and the ("upper") bus that is normally at high-voltage potential is designated with symbol 20. In the present case, an X-ray flash tube RR is provided as a load of the secondary winding $w_2$ of the pulse transformer PU, the transformation ratio u being 3, for example, which means that a high-voltage pulse of 30 kV, for example, originating at the primary winding $w_1$ is stepped up to three times this value by the pulse transformer, i.e. to about 90 kV; this high-voltage pulse is fed to the X-ray flash tube RR which generates high-intensity X-ray pulses in the submicrosecond range.

FIGS. 7 and 8 show a pulse transformer with ring core M4 and three smallest winding units $w_0$ having two turns $w_{01}$ and $w_{02}$ each. A star-shaped conductor 21, disposed in the projection of the window opening 5 of the ring core M4, is connected to the ends or starts a11, a21, a31 of the primary branches A1, A2, A3, while an outer annular conductor 22 is connected to the ends of the respective primary branches at a12, a22 and a32. A neutral point of the primary winding $w_1$ is designated by reference symbol a0. It may be seen that a11 three primary branches A1, A2, A3 are mutually parallel. The secondary branches B1, B2, B3, which have turns $w_{02}$ that are again bifilar to or doubly-wound with the turns $w_{01}$ of the primary winding $w_1$, are mutually connected in series; the winding start of the secondary winding $w_2$ is designated by reference symbol b11 and the winding end by reference symbol b32 With the three smallest winding units $w_0$, each formed of the primary and secondary winding branches A1, B1; A2, B2; A3, B3 and with these winding branches each including two turns $w_{02}$ and $w_{02}$, respectively, a transformation ratio of 3 is provided.

Again, two plate-shaped support insulators 1.1, 1.2 are spaced at a distance c from the wide sides of the ring core M4 and are connected in a suitable manner to the base plate 3 and to each other, while the transformer tank, the liquid dielectric and the high-voltage leadthroughs are omitted in this case as in FIGS. 1 and 3; it goes without saying that these elements may be constructed as shown in FIG. 5. Inserted between the ring core M4 and the support insulators 1.1, 1.2 are spacer blocks 23 of insulating material which, as seen in FIG. 7, are disposed in the gaps between the smallest winding units $w_0$. The spacer blocks 23 are only dynamically shown in FIG. 7.

Pulse generators with rotation-symmetrical, pulse-generating networks can be constructed with the ring core pulse transformer according to FIGS. 7 and 8, and the least possible contact inductances on a cylindrical current return on the switching element TH or F seen in FIGS. 5 and 6 can be provided.

Figure 9:
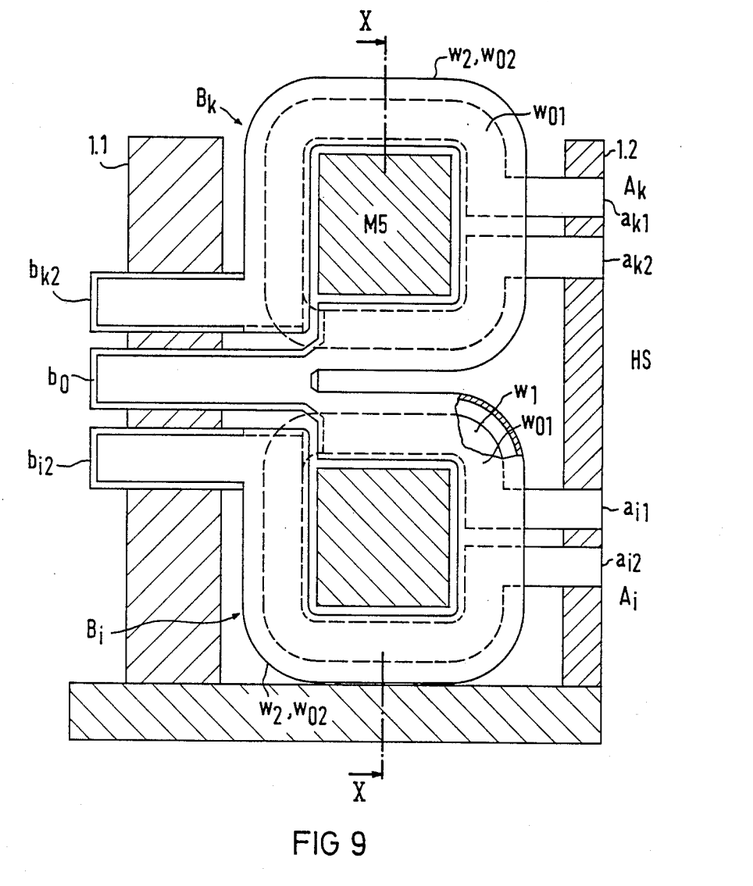
FIG. 9 is a cross-sectional view similar to FIGS. 1 and 8 of a fifth embodiment of the invention with a pulse transformer constructed as a current (step-down) transformer.
Figure 10:
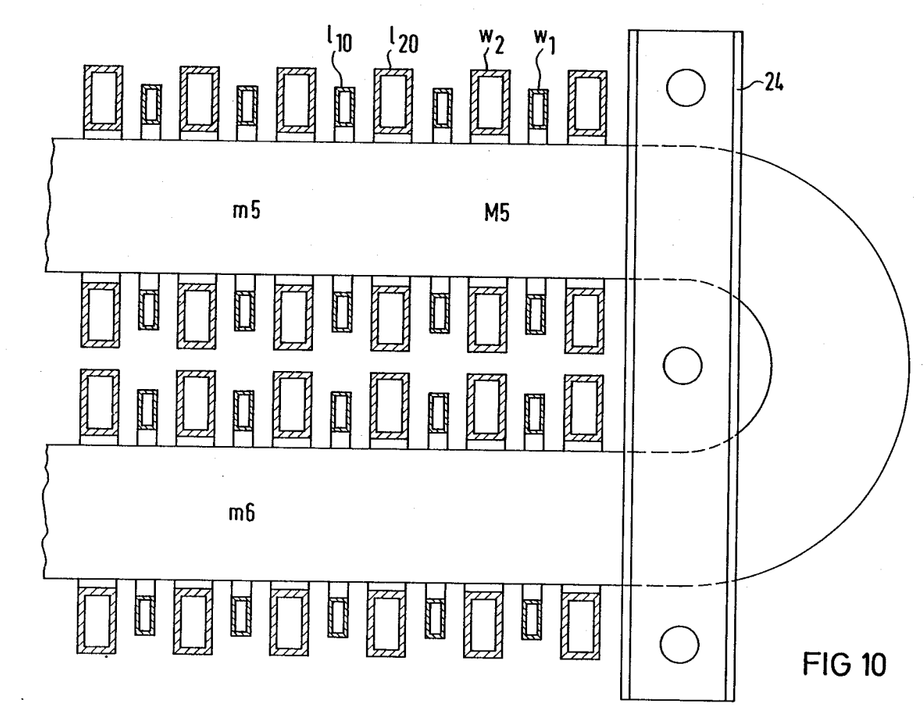
FIG. 10 is a fragmentary, partly sectioned view showing the oval magnet core and the cross-section of the winding conductors from above, taken along the line X—X in FIG. 9, in the direction of the arrows.

In the current transformer according to a fifth embodiment of the invention, shown in a simplified form in FIGS. 9 and 10, ends $a_{i1}$, $a_{i2}$ and $a_{k1}$, $a_{k2}$, respectively, of two primary winding branches $A_i$, $A_k$ are supported by the support insulator 1.2. All of the individual primary turns $w_{01}$ are connected in series, although the wiring connections are not shown. The high-current secondary winding $w_2$ with its turns $w_{02}$ and its secondary winding branches $B_1$ and $B_k$ is supported by the support insulator 1.1. The high-current secondary winding $w_2$ may include smallest winding units, all of which are mutually parallel or at least mutually parallel in groups.

FIG. 9 in conjunction with FIG. 10 shows as oval core M5 which is an elongated oval. An elongated oval, preferably of highly permeable material, of the C-core or tape-wound core type is particularly recommended. The tape-wound core M5 is supported by a solid steel support 24 so as to be fixed in relation to the windings $w_1$, $w_2$. This rigid retention is important because of the high current forces. The current terminals or winding ends on the secondary side in FIG. 9 are designated with reference symbol $b_{i2}$ for the lower leg m6 and with reference symbo $b_{k2}$ for the winding end of the secondary winding parts on the upper leg m5 while reference numeral $b_0$ designates a common terminal for the incoming and outgoing currents of the secondary winding $w_2$. The current terminals $b_{i2}$, $b_{k2}$ and $b_0$ permit a predominantly bifilar or doubly-wound connection to the load through non-illustrated strip conductors. It is possible with this current transformer configuration to provide ohmic resistances in the secondary winding $w_2$ of several $\mu$Ohms and current pulses of several Megaamperes.

As seen in FIG. 10, the high-current winding, which is constructed of rectangular conductor tubes $1_{20}$, may be flushed by a liquid coolant in order to carry away the copper losses serially, or in series-parallel connection, or with the cooling paths of each individual turn parallel to each other, depending on the capacity. The same may be applied analogously to the high-voltage winding $w_1$ for the primary side, the copper conductors of which are designated with reference symbol $1_{10}$. In the current or high-current transformer structure shown in FIGS. 9 and 10, the primary and secondary windings $w_1$, $w_2$ are cooled from both the inside with liquid coolant (especially water) and the outside by the cooling action of the dielectric which, at higher capacities and/or with more viscous dielectrics, may be circulated by a pump.

LIST OF PUBLICATIONS (1) V. E. Merchant, H. J. Sequin, J. Dow Rev. Sci. Instr 50 (9), Sep. 1979, pages 1151/3.
(2) European patent application No. 0 024 576
(3) M. Maters, R. Buffa, G. Conforti et al Rev. Sci. Instr. 54 (6), June 1983, pages 716/8
(4) R. Germer: J. Physics E12, 1979, pages 336/50
(5) H. Schields, A. J. Alcock Optics Communications, Vol 42, No. 2, pages 128/32
(6) J. I. Levatter and Z. Li Rev. Sci Instr. 52 (II), Nov. 1981, pages 1651/4
(7) J. A. Levatter, R. L. Sandstrom, J. H. Morris 4th IEEE Intern Pulsed Power Conference, Albuquerque Conference Report, pages 755/7
(8) J. D. Galbraith 3rd IEEE Pulsed Power Conference Report 11.5, pages 238/40
(9) "Scientific American", April 1980, pages 84/96
(10) German Published, Non-Prosecuted Application DE-OS No. 33 23 614

We claim:

1. High-power pulse transformer for short, high-voltage and/or high-current pulses, comprising:
    a container having walls, a base plate disposed in said container, high-voltage leadthroughs disposed in said container walls, an insulating, cooling dielectric liquid disposed in said container, said dielectric liquid having a given heat transfer coefficient $\alpha[w/m^2 \cdot K]$ with respect to an uncoated metal wall within the range of $\alpha_1 \leq \alpha \leq \alpha_2$, said uncoated metal wall comprising by definition a metal wall being covered by a thin oxide or lacquer film within the $\mu$m-range, the influence of which on the heat transfer coefficient or on the dielectric properties of the couple "metal wall - dielectric liquid" being negligible;
    at least one magnet core disposed on said base plate in said container, said magnet core having a central window formed therein defining an axis of said window and defining self-enclosed magnet legs disposed around said central window, said core having relatively wide sides normal to said axis of said window and relatively narrow sides;
    at least one undervoltage winding and at least one overvoltage winding each being disposed in said dielectric liquid, being wrapped in each other around parts of said magnet core immersed in said dielectric liquid and being linked to said magnet core and to each other, said windings including turns of substantially mutually doubly-wound electrically insulated metallic conductors having a given thickness and having terminal winding ends disposed in said leadthroughs, said conductors having surfaces with a heat transfer coefficient $\alpha$ with respect to said dielectric liquid being within said range $\alpha_1 \leq \alpha \leq \alpha_2$;
    said turns of each of said windings being self-supported and spaced apart from said turns of the other of said windings by a first minimum spacing and being spaced from said magnet core by a second minimum spacing;
    support insulators being partly disposed in said dielectric liquid and being adjacent and spaced from at least one of said sides of said magnet core by a third minimum spacing being greater than the sum of said second minimum spacing and said given thickness of said turns, at least said ends of said windings being secured in recesses formed in said support insulators; and
    means for retaining said magnet core and said support insulators on said base plate in said container.

2. High-power pulse transformer according to claim 1, including support and terminal points disposed on said support insulators at said recesses;
    said windings each being in the form of a winding helix and each being divided into smallest winding units each including at least one undervoltage winding and at least one overvoltage winding in the form of winding branches having mutually adjacent turns each surrounding one of said magnet legs and being mutually spaced apart by said first minimum spacing and being mutually parallel as viewed in axial direction of said winding helix;

said winding ends of a multiplicity of said parallel smallest winding units being conducted to said support and terminal points on said support insulators; and said conductors of a given number of said smallest winding units of said undervoltage and overvoltage windings being conducted to said support and terminal points for attaining a desired transformation ratio.

3. High-power pulse transformer according to claim 1, wherein each one of said support insulators is associated with a respective magnet core leg.

4. High-power pulse transformer according to claim 1, wherein one of said support insulators is associated with each respective wide side of said magnet core.

5. High-power pulse transformer according to claim 1, wherein said support insulators are plate-shaped.

6. High-power pulse transformer according to claim 1, wherein said winding ends of said smallest winding units formed of said winding branches of said undervoltage winding are supported by and connected to one of said support insulators, and said winding ends of said smallest winding units formed of said winding branches of said overvoltage winding are supported by and connected to another of said support insulators.

7. High-power pulse transformer according to claim 1, wherein at least one of said windings carries high current and said turns and said conductors are hollow and are cooled from the inside by a liquid coolant.

8. High-power pulse transformer according to claim 1, wherein said undervoltage winding carries high current and is formed of parallel partial winding units having hollow turns and conductors and said overvoltage winding carries high voltage and is formed of mutually series-connected partial winding units formed of hollow turns and conductors.

9. High-power pulse transformer according to claim 1, wherein said core is rectangular.

10. High-power pulse transformer according to claim 1, wherein said core is rectangular and has a double U-shape.

11. High-power pulse transformer according to claim 1, wherein said core is annular.

12. High-power pulse transformer according to claim 1, wherein said core is oval.

13. High-power pulse transformer according to claim 1, wherein said conductors are formed of a good conducting material having a specific resistance of $0.016 \leq \rho[\Omega \times mm^2/m] \leq 0.029$ at 20° C. and said surfaces of said conductors have a structure within the band width which is bare metal with a thin oxide skin.

14. High-power pulse transformer according to claim 1, wherein said conductors are formed of a good conducting material having a specific resistance of $0.016 \leq \rho[\Omega \times mm^2/m] \leq 0.029$ at 20° C. and said surfaces of said conductors have a structure within the band width which is bare metal with a thin protective lacquer film.

* * * * *